(No Model.)

C. A. BRYANT.
GLOVE FASTENER.

No. 423,665. Patented Mar. 18, 1890.

UNITED STATES PATENT OFFICE.

CHARLES A. BRYANT, OF WAKEFIELD, MASSACHUSETTS.

GLOVE-FASTENER.

SPECIFICATION forming part of Letters Patent No. 423,665, dated March 18, 1890.

Application filed December 24, 1889. Serial No. 334,839. (No model.)

*To all whom it may concern:*

Be it known that I, CHARLES A. BRYANT, of Wakefield, in the county of Middlesex and State of Massachusetts, have invented a new Improvement in Glove-Fasteners, (A;) and I do hereby declare the following, when taken in connection with accompanying drawings and the letters of reference marked thereon, to be a full, clear, and exact description of the same, and which said drawings constitute part of this specification, and represent, in—

Figure 1:
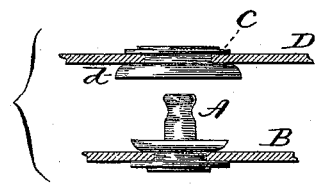
Figure 2:
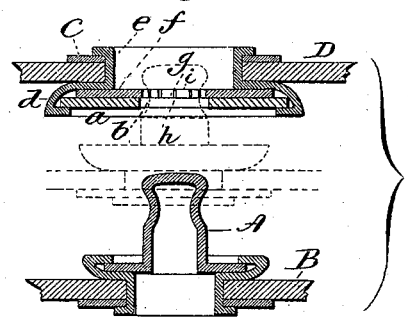
Figure 3:
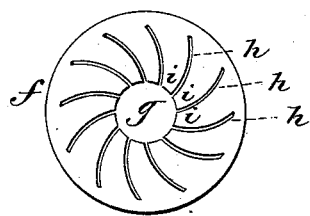

Figure 1, a sectional view of the two flaps of a glove, representing the two members as attached, but separated; Fig. 2, a vertical section through the same two members enlarged; Fig. 3, the disk $f$ detached.

This invention relates to an improvement in that class of glove-fasteners which consist of two members—one in the form of a headed stud adapted for attachment to one flap of the glove and the other in the form of a spring-socket attached to the other flap of the glove, and into which socket the headed stud enters, some portion of the socket yielding for such entrance of the stud and then reacting to engage the head of the stud after it is so introduced, and thereby secure the two flaps of the glove together, but yet so that the socket may be readily withdrawn from the stud as occasion requires, this invention relating particularly to the spring or elastic portion of the socket which engages the head of the stud member; and the invention consists in the socket member of a glove-fastener having an opening into it of somewhat greater diameter than the head of the stud, and so as to pass freely over it, combined with a disk within the socket, the said disk having an opening through it of somewhat less diameter than the diameter of the head, the said disk slit from the opening toward the circumference, but in a direction oblique to the radius, the portions between the slits forming tongue-like springs, and which, because of the oblique slit, are made elastic in the direction of the plane of the disk.

A represents the stud member of the fastener, which is secured to one flap B of the glove, and preferably so that the stud will project outward. The stud is headed in the usual manner and may be of any of the usual constructions.

C represents the socket member, which is secured to the flap D of the glove. This socket member is best composed of a disk $a$, having a central opening $b$ through it of somewhat greater diameter than the diameter of the head of the stud A, and so that the said stud may freely pass through it. This disk $a$ is inclosed in a body $d$, which is constructed with a central tubular shank $e$, adapted to pass through a corresponding opening in its portion D of the glove, and the end of the shank turned down upon the outside to secure the socket to the flap.

Within the socket a disk $f$ is arranged. This is best made, as shown, of a diameter so as to set between the disk $a$ and the body $d$, and so as to be secured by the closing of the body upon the disk $a$. The disk $f$ is shown detached in Fig. 3. It is made from suitable elastic metal and has an opening $g$ through it of a diameter somewhat less than the diameter of the head of the stud to be engaged. From this central opening $g$ slits $h$ are cut, running in a direction oblique to the radius from the opening to a point near the circumference, and so as to form a series of tongues $i$ around the opening $g$. By making the slits $h$ oblique a greater length of spring is attained than would be attained were the slits radial. This increased length of tongue permits a considerable degree of elasticity in the direction of the plane of the disk, and so that when the disk $f$ is inclosed within the socket, as seen in Fig. 2, the tongues project over the opening $b$ through the outer disk $a$ and lie close on the surface of the disk $a$, so as to be free to move in their own plane. As the stud is introduced to the socket the head strikes the ends of the spring-tongues, and under pressure they readily yield, turning in their own plane sufficiently to enlarge the opening $g$ for the introduction of the head. Then on the withdrawal of the stud the same action is produced by the neck or under side of the head of the stud to force the springs outward to enlarge the opening, so that the head may be withdrawn.

The elasticity of the spring-tongues makes them so free that the stud may be readily introduced or removed, and yet the grasp of the springs upon the stud is sufficient for the proper retention of the stud when engaged.

I claim—

1. The herein-described improvement in the socket member of a glove-fastener, consisting of a flat disk $f$, secured within the socket, the disk constructed with a central opening $g$ of somewhat smaller diameter than the diameter of the head member of the fastener, and the said disk slit from the said opening outward, the slits running in a direction oblique to the radius and toward the circumference, so as to form a series of spring-tongues $i$ around the said opening $g$, substantially as and for the purpose described.

2. In the socket member of a glove-fastener, the combination of the body of the socket constructed with a tubular shank, the body adapted to bear upon one surface of the flap and the end of the socket to be struck down upon the reverse side of the glove, with a disk $a$, having a central opening through it of larger diameter than the diameter of the head of the stud, a second disk $f$ inside the said disk $a$, the said disk $f$ having an opening through it of less diameter than the diameter of the head and constructed with radial slits running from the said opening in a direction oblique to the radius toward the edge of the disk, the said two disks arranged in the body and the edge of the body closed over the said disk $a$, substantially as described, and whereby said disk $f$ is firmly secured in the body.

CHARLES A. BRYANT.

Witnesses:
FRANK H. BRYANT,
EUGENE C. BRYANT.